United States Patent [19]

Loeser et al.

[11] 4,114,505

[45] Sep. 19, 1978

[54] COATINGS AND METHODS OF APPLICATION

[76] Inventors: William J. Loeser, 4911 Valkeith, Houston, Tex. 77096; Julius A. Loeser, 5828 County Rd. 910, Houston, Tex. 77037

[21] Appl. No.: 763,725

[22] Filed: Jan. 31, 1977

[51] Int. Cl.² .......................... F16B 33/06; C25D 5/48
[52] U.S. Cl. .................................. 85/1 C; 204/38 E; 427/409; 427/388 C
[58] Field of Search ......... 204/38 E; 427/409, 388 C, 427/388 D; 428/422; 148/6.15 R; 85/1 C

[56] References Cited

U.S. PATENT DOCUMENTS

| 3,364,081 | 1/1968 | Forsberg | 204/38 E |
|---|---|---|---|
| 3,494,243 | 2/1970 | Kleinhenn | 85/1 C |
| 3,877,998 | 4/1975 | Guhde | 148/6.15 R |
| 4,003,760 | 1/1977 | Labenski et al. | 427/409 |
| 4,074,011 | 2/1978 | Teramae et al. | 85/1 C |

OTHER PUBLICATIONS

Metal Finishing Guidebook and Directory, 1975, p. 531.

Primary Examiner—John H. Mack
Assistant Examiner—William Leader
Attorney, Agent, or Firm—Bard and Groves

[57] ABSTRACT

A method of providing a protective coating for a metallic object required to retain lubricity notwithstanding prolonged submersion in a deleterious environment such as salt water. The object is first plated with a preselected corrosion-resistant metal. Next, the plating on the object is phosphatized or otherwise processed to improve its bonding capability, and then the object is coated with a fluorocarbon polymer to impart lubricity to the object sought to be protected.

In an alternative form of the process, wherein the object is electroplated or otherwise coated with a metal incapable of being phosphatized, the bonding capability of the electroplating is improved by providing it with a matte surface, as by sandblasting or the like, in preparation for the fluorocarbon polymer outer coating.

7 Claims, No Drawings

COATINGS AND METHODS OF APPLICATION

BACKGROUND OF THE INVENTION

This invention relates generally to methods for protecting metallic objects and the like from injury arising from deleterious environmental characteristics, and more particularly relates to a method for providing a metallic object with a protective coating having lubricious character. This invention also relates to a novel coating for both protecting and providing lubricity to a metallic object intended to be subjected to prolonged exposure in a salt-water environment and the like.

The coating of metallic articles exposed to corrosive elements, such as may be found in petrochemical and undersea environments, is well known, and the prior art is prolix with attempts to provide long lasting corrosion-resistant coatings for metals used in structures and equipment exposed to such environments. It is known, for example, to plate or clad metals with other (more active) metals, thereby permitting the plated or clad metal to corrode in lieu of the base metal. Thus, galvanized iron obtains its corrosion-resistant character by sacrificing its coating of zinc in lieu of the iron thereneath. Similarly, high-purity aluminum or aluminum-copper alloys, and also cadmium alloyed with tin, steel, nickel, and copper, are used in the same manner to coat the underlying metal or alloy sought to be protected. It is further known to plate metals with unalloyed nickel, cadmium, zinc, and other metals that are normally cathodic with respect to the base metal.

Another group of corrosion-resistant coatings, include such materials as chemical conversion coatings constituting stable films on the metal sought to be protected. An example of such a coating is the film formed on a metal article when it is exposed to a phosphate of the same metal. Additionally, inhibitors such as molybdenum have been used in a sulfate solution to form the film on the metal article. However, such films are susceptible to penetration by concentrations of specific anions which are corrosive to the base metal.

However, the corrosion-resistant coatings of the prior art, while effectively protecting the metal articles, may themselves become corroded to such an extent that two interconnected parts, such as comprise a fastener, may require descaling or torch-cutting to separate the parts. In some environments, the use of a torch to separate the interconnected parts is a highly complicated process. Further, some corrosive environments also contain explosive mixtures, wherein even the simple steps of descaling, such as with a wire brush, may create a spark which will ignite the explosive mixtures.

These and other disadvantages of the prior art are overcome with the present invention, wherein novel methods of providing a metallic article with a lubricious, corrosion-resistant coating are disclosed herein.

SUMMARY OF THE INVENTION

This invention is a process or coating which not only provides greater protection for a metal object from harmful environmental effects but also provides lubriciousness with respect to other objects with which it may be engaged. More particularly, the object to be treated is provided with a base coating of corrosion-resistant metal and a secondary outer coating of a suitable polymer resin of the type commonly referred to as "Teflon", which not only gives the object a lubricious surface but which also seals and protects both the base metallic coating and the metal object itself. In an ideal embodiment of the invention, the metal object to be treated is first plated in a conventional manner with zinc, cadmium, or the like, to provide a base coating of corrosion-resistant metal. Next, the outer surface of the zinc or cadmium plating is treated to improve its cohesive characteristics with respect to the "Teflon" or other lubricious material. Thereafter, the plated object is dipped or sprayed with "Teflon" to give it an outer protective coating which not only protects the object with respect to cracks or other fissures in the plating of zinc or cadmium, but which also provides the object with a lubricious surface as hereinbefore stated.

It will be apparent that proper preparation of the outer surface of the plating, to enhance its cohesive characteristics with respect to the "Teflon" coating, is a particular feature of the invention. In those instances in which the plating is composed of a metal such as zinc or cadmium, an ideal manner of treating the plating is by the well-known "Parkerizing" process, in which the object is dipped in a phosphate solution, such as manganese phosphate, to give it an external film of zinc or cadmium phosphate. In those instances wherein the plating is nickel, gold or the like, and which therefore can not be phosphatized, the nickel or gold plating is sandblasted or otherwise processed to give it a matte finish which will more effectively retain the overcoating of "Teflon" and the like.

Accordingly, it is a feature of the present invention to provide a metal object with a corrosion-resistant lubricious coating which maintains lubricity during prolonged exposure to deleterious environments.

This and other features and advantages of the present invention will become apparent from the following detailed description.

DETAILED DESCRIPTION

In accordance with the present invention, a protective coating having lubricious characteristics is applied to a metallic object, such as a nut, stud bolt or the like, using a three-step process. In the first step of such coating process, the object is plated with a metal selected for suitable corrosion-resistant properties, but which also has an oxidation couple less than the oxidation couple of the metal object. Among such metals are zinc, cadmium, nickel, copper, brass, tin and gold.

In the preferred embodiment, the protective plating is applied by electroplating the metal object with zinc or cadmium. For other embodiments, the object may be electroplated using other metals, such as the above-mentioned nickel, copper, brass, tin and gold. In an alternative form of the preferred embodiment, the protective plating is applied by electroless plating the object with nickel phosphorous.

Other embodiments of the invention may utilize other methods for plating the metal object. Examples of such other methods include spraying the object with molten metal and bombarding the object in a bead-blast chamber with powdered plating metal.

The second step comprises enhancement of the cohesion characteristics on the surface of the metal plate. The method used for such enhancement will depend upon the selected plating metal. Zinc or cadmium, for example, react to form a phosphate film when exposed to solutions of metallic phosphates such as zinc phosphate and manganese phosphate. These phosphate films have excellent cohesion characteristics. Thus, in a preferred embodiment, objects plated with a metal which reacts with metallic phosphate solutions will be phosphatized to enhance the cohesion characteristics of the plated object.

In an alternative embodiment, a chromate solution of a metal such as zinc or iron is used in place of the metallic phosphates to enhance the cohesion characteristics of the plating surface. The formation of chromate films on the plating surface will be as above-described for the formation of the phosphate films.

Other metals, such as nickel or gold, do not react to form phosphate films as above-described. The use of such metals will require different methods for enhancing of the cohesive characteristics of the plating surface. In a preferred embodiment, the plated object is abrasive-blasted to form a matte finish on the surface of the plating. In an alternative embodiment, the plated object may be exposed to an acid solution, such as a combination of nitric and hydroflouric acid, which will etch the matte finish on the plating surface.

The third step in the coating process comprises applying an outer coating of selected flurocarbon polymer resin, such as "Teflon" and the like, to the cohesion surface formed on the plated object. In the preferred embodiment, the ploymer resin is selected for its relative lubricity. Conventional application techniques are used to apply the polymer resin to the object. Examples of such techniques are pressure spraying, electrostatic spraying, conventional gun spraying. After application of the polymer resin, the resin-covered object is placed in an oven and heated to bond the outer coating.

The invention is illustrated by the following examples.

EXAMPLE I

A standard steel stud bolt was placed in a glassbead blast chamber to remove scale, rust and the like. The descaled bolt was removed and rinsed with ambient $H_2O$ and placed in a tank containing commercial BN alkaline solution at 220° F. With the bolt acting as a cathode and an anode placed in the solution, an electric current was passed through the solution for fifteen minutes to remove grease and the like. The bolt was then removed from the BN solution and rinsed with ambient $H_2O$. Next, the bolt was dipped in a tank containing muriatic acid for thirty seconds and then removed. The bolt was then rinsed with ambient $H_2O$. The bolt was then placed in a tank containing an alkaline cyanide zinc electroplating solution at a controlled maximum temperature of 90° F. An electric current was passed through the solution for a period of time sufficient to deposit 0.0002 to 0.0005 inches of zinc on the surface of the bolt. The bolt was then removed and rinsed with ambient $H_2O$. Next, the bolt was dipped in a tank containing a solution of zinc phosphate at 160° F. for a period of forty-five seconds to form a phosphate film over the plate. The bolt was then removed and first rinsed with ambient $H_2O$ and then rinsed with $H_2O$ at an elevated temperature to harden the film coating. Next, a coating of liquid fluorocarbon polymer resin was applied with a hand sprayer and the bolt was then placed on a rack in a bake oven. The bolt was sintered at a controlled temperature of approximately 400° F. for substantially one hour, after which time the rack was removed from the oven and the bolt allowed to cool.

EXAMPLE II

The procedure in Example I was followed through the ambient $H_2O$ rinse following removal from the muriatic acid solution. Next, the bolt was placed in a tank containing a solution of nickel phosphorus at substantially 200° for a time period sufficient to electroless nickel plate the bolt with a thickness of 0.0002 to 0.0005 inches of nickel. Electroless plating or deposition is defined (see Hackh's Chemical Dictionary, 4th Edition) as the deposition of a metal in solution on another solid metal by chemical means, instead of by means of an electrical current as in electrodeposition. The bolt was then removed and rinsed with ambient $H_2O$. The bolt was then placed in a sand blast chamber and blasted with a fine silicon grit to produce a matte finish on the nickel plate. Next, the ambient temperature rinse, polymer resin coating and baking procedure of Example I were followed through removal of the cooling rack from the oven to allow the bolt to cool. As this example does not include phosphate film formation, the elevated $H_2O$ rinse of Example I is omitted.

EXAMPLE III

A stainless steel bolt was prepared by following the procedure in Example I to the point removal from the BN solution and $H_2O$ rinse. The bolt is then placed in a solution containing a combination of nitric and hydroflouric acid. In the case of stainless steel, the bolt is left in the acid bath for a period of time sufficient to form a matte finish on the surface of the bolt. The bolt is then removed and the ambient temperature rinse, polymer resin coating and baking procedure of Example I are followed through rack removal from the oven. Again, the elevated $H_2O$ rinse is omitted.

EXAMPLE IV

The procedure in Example I was followed throughout with the exception that an alkaline cyanide cadmium electroplating solution was used in place of the alkaline cyanide zinc electroplating solution in order to provide a cadmium plating on the bolt having a thickness of 0.0002 to 0.0005 inches.

EXAMPLE V

The procedure of Example I was followed throughout with the exception that a manganese phosphate solution was used in place of the zinc phosphate solution to form the phosphatized film coating on the bolt.

EXAMPLE VI

The procedure of Example I was followed through the ambient $H_2O$ rinse following removal from the muriatic acid with the exception that an alkaline cyanide gold solution was used in place of the alkaline cyanide zinc solution to electroplate the bolt with a gold plate having a thickness of from 0.0002 inches to 0.0003 inches. After the fourth ambient $H_2O$ rinse, the procedure of Example II was followed through removal of the bolt from the oven.

The invention is further illustrated by the results of a salt fog test, as described in the following examples, which was performed on objects coated according to the present invention and objects coated with various other commercial coatings, each object having an outer coating of polymer resin.

EXAMPLE VII

A fastener, including a stud bolt and a nut, was coated according to the present invention. The fastener was placed in a chamber designed to produce a saline fog.

The fastener was positioned in the chamber so as to permit free settling of fog on the fastener.

The saline fog was produced by atomizing a salt solution by forcing compressed air through an atomizing nozzle with the salt solution. The compressed air was free from dirt and oil and maintained at 103.5 kN/m² (15 psi) ± 0.7 kN/m² (0.1 psi). The salt solution was prepared by dissolving 5 ± 1 parts of sodium chloride, substantially free from impurities, in 95 parts of distilled water containing not more than 200 ppm of total solids. The pH of the salt solution was adjusted such that, when atomized at a temperature of 39° C. (95° F.), solution collected from the chamber had a pH within the range of 6.5 to 7.2.

During the test, the fastener was positioned so that drops of solution accumulating on the interior of the chamber did not fall on the fastener. Additionally, two fog collectors were placed within the chamber to collect solution at a rate of 1.5 ml per hour for use in pH testing. The temperature within the exposure zone in the chamber was maintained at 35° + 1.1° − 1.7° C. ( (95° + 2° − 3° F.). Further, the fog nozzle was baffled so that spray emitting therefrom did not impinge directly on the fastener.

The test was terminated and the fastener removed from the chamber after 4,000 hours of substantially continuous testing. The fastener showed no signs of rust, corrosion or staining. The nut turned freely on the stud bolt and the fastener was completely functional.

EXAMPLE VIII

A stud bolt-and-nut fastener utilizing only a fluorocarbon polymer resin outer coating was subjected to the salt fog test as described in Example VII. After exposure for 471 hours, the fastener displayed severe rusting with the nut difficult to turn on the stud bolt. After 504 hours exposure, the nut would not turn on the stud bolt, and the fastener was therefore no longer releasable.

EXAMPLE IX

A stud bolt-and-nut fastener, pre-treated with manganese phosphate and provided with an outer coat of fluorocarbon polymer resin, was subjected to a salt fog atmosphere as described in Example VII. After 1,368 hours, moderate rust was observed to have formed on the fastener, and the test was terminated.

EXAMPLE X

A stud bolt-and-nut fastener, pre-treated with manganese phosphate and having both a primer coat and an outer coat of fluorocarbon polymer resin, was subjected to the salt fog test described in Example VII. After 1,560 hours, moderate rust was beginning to form on the fastener assembly and the test was then terminated.

EXAMPLE XI

A stud bolt-and-nut fastener, having both a primer coat and an outer coat of flurocarbon polymer resin, was subjected to the salt fog test described in Example VII. After exposure for 1,032 hours, moderate rust had formed making the nut difficult to turn on the bolt. After a total of 1,368 hours the nut would not turn on the stud bolt, and the fastener was not releasable.

Numerous variations and modifications may obviously be made in the method herein described without departing from the present invention. Accordingly, it should be clearly understood that the forms of the invention herein described and shown in the figures of the accompanying drawings are illustrative only and are not intended to limit the scope of the invention.

What is claimed is:

1. A method of preparing a metallic nut and bolt type fastener such that the fastener is operable after exposure in and to a deleterious environment, comprising the steps of
    applying to the fastener a protective coating of another different metal anodic to the metallic fastner,
    thereafter enhancing the cohesion characteristics of said protective coating by immersing said object in a metallic phosphate bath to form a chemical reaction film on the exterior surface of said protective coating on the fastener, and
    thereafter applying a lubricious coating of flurocarbon polymer resin to said chemical reaction film on said protective coating for providing the fastener with an external lubricious surface which enhances fastener operability after exposure of the fastener in and to the deleterious environment.

2. The method disclosed in claim 1, wherein said metallic phosphate in said bath is selected from the group consisting of zinc phosphate, manganese phosphate and iron phosphate.

3. The method described in claim 1, wherein said protective coating is applied by the step of electroplating the metallic fastener with said another different metal anodic to the metal from which the fastener is formed.

4. The method described in claim 3, further including electroplating said metallic fastener with a metal selected from the group consisting of zinc and cadmium.

5. The method described in claim 4, wherein said lubricious coating is applied by the steps of coating said fastener with a selected flurocarbon polymer resin in liquid form, and
    thereafter heating said fastener at substantially the sintering temperature of said selected fluorocarbon polymer resin during a preselected time interval.

6. A nut and bolt type fastener and the like having a lubricious coating applied in accordance with the method described in claim 1.

7. A nut and bolt type fastener and the like having a lubricious coating applied in accordance with the method described in claim 5.

* * * * *